Patented Jan. 8, 1935

1,987,203

UNITED STATES PATENT OFFICE 1,987,203

COMPOSITION FOR FILLING SHOE BOTTOMS

Harold S. Miller, Quincy, and Charles W. Sargent, Lynn, Mass., assignors to Beckwith Manufacturing Company, Boston, Mass., a corporation of Massachusetts No Drawing. Application August 29, 1931, Serial No. 560,244

2 Claims. (Cl. 106—23)

This invention relates to compositions for filling the hollow space or cavity occurring in shoe bottoms between the outer and inner soles of many makes of shoes. The object of the present invention is to provide a composition which falls into the class of so-called hot fillers, that is, those which are normally solid but which are rendered plastic and spreadable under the application of moderate heat. Another object is to provide a novel composition of this character, which, in addition to being made up of a new combination of ingredients, contains such ingredients combined in proportions imparting to the composition optimum characteristics for filling shoe bottoms.

After long experience with, and investigation of, different kinds of compositions for filling shoe bottoms, we have determined by experimentation that the best kind of hot filler composition should be made up of at least three components as a homogeneous blend, viz., solid rubber, a thermoplastic material preferably of waxy character, and bulky material like wood flour, granulated cork, asbestos, or wood pulp. More especially, we have found that the thermoplastic material should be used in amount by weight at least about equal to that of the rubber, in order to secure the desired thermoplasticity of the blended mass; and further, that the bulky material should be used in amount by volume of at least about 30%, based on the volume of both the thermoplastic material and the rubber, in order to realize the proper weight, body, resiliency, and other qualities in the applied and set composition. Each component in such a composition plays an important and indispensable role, in so far as concerns adapting it for satisfactory use in the filling of shoe bottoms. The thermoplastic material not only serves as a carrying medium for the rubber and also to render the composition as a whole thermoplastic under the application of heat, but in the case of specific thermoplastic materials, like Montan or other waxes, which we prefer to use, gives the moderately heated composition a buttery consistency at which it is amenable to easy spreading and smoothing out with a spatula or knife, in a shoe bottom, without trouble on account of undue stickiness. The rubber is an excellent bonding agent and, together with the bulky material, inhibits crawling or creeping of the composition from the applied position, and also furnishes the desired resiliency, especially in combination with granulated cork as the bulky material. The bulky material is further desirable, not only because of its body, bulk, and light weight, but also because it enhances the spreadability of the hot, plastic composition and breaks up the continuity of the otherwise perspiration-impermeable layer of composition to permit "breathing" of the foot. The composition of the present invention affords comfort to the shoe-wearer long after the shoes have ceased to be brand new, for there is little, if any, tendency for local displacement of the composition to ensue during the use of the shoes. This latter fault is one which has heretofore been only too often prevalent in a hot shoe filler composition, which, under walking pressure coupled with the heat and perspiration transmitted through the inner sole thereto, was squeezed out toward the marginal, toe and shank portions of the sole and gave rise to a central pocket or depression in the inner sole and uneven wear of the outer sole.

In preparing the composition of the present invention, we may proceed substantially as follows. The solid rubber used as a raw material is initially plasticized or "broken down" in a jacketed, internal rubber-mixer, for instance in a Banbury mixer. To 15 parts by weight of smoked sheet or other similar specie of resilient rubber thus conditioned is gradually added about 35 parts by weight of Montan wax while steam is being passed through the jacket to heat the mass to a temperature preferably of about 170° to 180° F., at which temperature the wax is readily miscible with the rubber. To the plastic mixture is then added about 45 parts by weight of wood flour of a particle size of, say, about 35 mesh, which, on a volumetric basis, corresponds to about 75% by volume of both the rubber and wax. While the mixer is in operation, it is preferable to add to the mass not more than about 30 parts by weight of an oleaginous material like so-called rosin residue, which is a thick, viscous liquid available as a by-product in the manufacture of rosin. The oleaginous material adds pliancy to the composition under normal temperature conditions, without detracting from the other qualities desired therein. It also facilitates the softening of the composition under the application of only moderate heat, for instance the heat furnished by steam at a temperature not exceeding about 212° F. If desired, two parts of ferric oxide or other pigmenting agent may be disseminated throughout the mass during the mixing operation. The homogeneously heat-blended mass sets to a normally solid condition, in which condition it may be packaged in cans or other containers for shipment to the shoe factory. Under the application of moderate heat, the composition attains a smooth, buttery consistency,—so much so that it can be readily extruded in such condition under pressure from a gun or other instrumentality, in appropriate amount, on to a shoe bottom, spread to the desired thickness, and levelled or rolled down to present a smooth surface of contact with the outer sole. Upon setting, it acquires the important properties hereinbefore mentioned, as well as water resistance, integrity of structure, and resistance to wear.

The procedure in proportions of ingredients hereinbefore given may be varied while still falling within the purview of the present invention. Indeed, it is only necessary that the three primary ingredients of my composition be uniformly blended in the proper proportions to arrive at a composition having the desired qualities. In this connection, it might be mentioned that the rubber could be plasticized on the usual roll-mill and then incorporated along with the other ingredients into a batch of pre-molten Montan wax in any suitable type of mixing machine, although a jacketed, internal rubber-mixer is perhaps to be preferred when available, as it permits the preparation of a batch of the composition in a single operation, with minimum handling. The composition may be conveniently packaged immediately after its preparation, that is, while it is still in hot, plastic condition, and thus assumes the contour of the can or other container into which it is placed. The rubber used in the composition may be reclaimed, rather than the crude variety. The thermoplastic material may be other than Montan wax, say, paraffin wax, carnauba wax, or the like. The waxy thermoplastic materials are, however, preferable, in that they impart minimum stickiness to the composition under the application of moderate heat. The bulky material may, as already indicated, be granulated cork or fibrous material of the nature of asbestos or wood pulp. Granulated cork, being more bulky than wood flour, may be used in amount by weight less than wood flour, but in the case of granulated cork or any other bulky material, it should constitute at least about 30% by volume of both the rubber and thermoplastic material which enter into the composition. While it is possible to dispense with the oleaginous material, nevertheless such material constitutes a valuable addition to the composition. Engine oil, pine oil, liquid wax tailings, or the like serve well in lieu of rosin residue, which was mentioned in the specific example primarily because it is an inexpensive agent.

What we claim is:

1. A shoe-bottom-filling composition having a normally solid state but capable of assuming a smooth, plastic, and easily spreadable consistency under the application of moderate heat, comprising a homogeneous blend of solid and resilient rubber of the nature of smoked sheet, a thermoplastic material consisting essentially of Montan wax in amount by weight at least about equal to that of the rubber, and a comminuted, bulky material permeable to moisture and hence imparting "breathing" qualities to the composition when set in a shoe bottom, in amount by volume at least about 30% of the volume of both the rubber and thermoplastic material, said composition when set in a shoe bottom being resilient and being substantially without tendency to creep under the pressure of the foot.

2. A shoe-bottom-filling composition having a normally solid state but capable of assuming a smooth, plastic, and easily spreadable consistency under the application of moderate heat, comprising essentially a homogeneously heat-blended mass of solid and resilient rubber of the nature of smoked sheet, a wax selected from a class consisting of Montan, paraffin, and carnauba wax in amount by weight at least equal to that of the rubber, and a comminuted, bulky material, like wood flour, granulated cork, and wood pulp, permeable to moisture and hence imparting "breathing" qualities to the composition when set in a shoe bottom, in amount by volume at least about 30% of the volume of both the rubber and thermoplastic material, said composition when set in a shoe bottom being resilient and being substantially without tendency to creep under the pressure of the foot.

HAROLD S. MILLER.
CHARLES W. SARGENT.